(12) United States Patent
Hong et al.

(10) Patent No.: US 6,654,208 B2
(45) Date of Patent: Nov. 25, 2003

(54) REDUCED INERTIA ACTUATOR PIVOT ASSEMBLY

(75) Inventors: Yiren Hong, Singapore (SG); Mo Xu, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 71 days.

(21) Appl. No.: 09/896,383

(22) Filed: Jun. 29, 2001

(65) Prior Publication Data

US 2002/0024770 A1 Feb. 28, 2002

Related U.S. Application Data

(60) Provisional application No. 60/227,614, filed on Aug. 23, 2000.

(51) Int. Cl.⁷ .................................................. G11B 5/48
(52) U.S. Cl. ................................................... 360/265.9
(58) Field of Search .......................... 360/265.2–266.1, 360/244.5

(56) References Cited

U.S. PATENT DOCUMENTS

| 4,391,035 A | * | 7/1983 | Van de Bult ............ 360/264.7 |
| 4,682,255 A | | 7/1987 | Sleger et al. |
| 4,713,703 A | | 12/1987 | Asano |
| 4,984,115 A | | 1/1991 | Takahashi et al. |
| 5,034,837 A | | 7/1991 | Schmitz |
| 5,491,599 A | | 2/1996 | Sogabe |
| 5,579,190 A | | 11/1996 | Mastache et al. |
| 5,625,515 A | | 4/1997 | Brown |
| 5,801,902 A | | 9/1998 | Koeppel et al. |

* cited by examiner

Primary Examiner—A. J. Heinz
(74) Attorney, Agent, or Firm—Derek J. Berger

(57) ABSTRACT

A pivot assembly for use with a planar disc drive actuator has bearings which are mounted within the deck of a disc drive. A pivoting shaft is supported by the bearings and extends upwardly, and includes an upper surface for supporting the actuator. A fastener is provided which secures the actuator to the upper surface of the pivot shaft.

19 Claims, 4 Drawing Sheets

REDUCED INERTIA ACTUATOR PIVOT ASSEMBLY

CROSS REFERENCE TO RELATED APPLICATIONS

This application claims the benefit of U.S. Provisional Application Number 60/227,614, filed Aug. 23, 2000.

FIELD OF THE INVENTION

This invention relates generally to the field of hard disc drive data storage devices, and more particularly, but not by way of limitation, to rotational movement of disc drive actuators.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 15,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative pneumatic relationship with a thin layer of air dragged along by the spinning discs to fly the head assembly in a closely spaced relationship to the disc surface. In order to maintain the proper flying relationship between the head assemblies and the discs, the head assemblies are attached to and supported by flexures attached to the actuator.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. The actuator is mounted to the pivot shaft by precision ball bearing assemblies within a bearing housing. The actuator supports a flat coil which is suspended in the magnetic field of an array of permanent magnets, which are fixedly mounted to the disc drive housing base member. These magnets are typically mounted to pole pieces which are held in positions vertically spaced from another by spacers at each of their ends.

On the side of the actuator bearing housing opposite to the coil, the actuator assembly has typically included a plurality of vertically aligned, radially extending actuator head mounting arms, to which the head suspensions mentioned above are mounted. These actuator arms extend between the discs, where they support the head assemblies at their desired positions adjacent the disc surfaces. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved generally radially across the data tracks of the discs along an arcuate path.

As explained above, the actuator assembly typically includes an actuator body that pivots about a pivot mechanism disposed in a medial portion thereof. The function of the pivot mechanism is crucial in meeting performance requirements associated with the positioning of the actuator assembly. A typical pivot mechanism takes the form of a bearing cartridge having upper and lower bearings with a stationary shaft attached to an inner race and a sleeve attached to an outer race. The sleeve has typically been secured within a bore in the actuator body using a set screw, a C-clip, a tolerance ring or press-fitting, while the stationary shaft typically is attached to both the base deck and the top cover of the disc drive.

Recently, advances in storage technology have greatly increased the data storage capacity of magnetic storage discs. As a result, a single storage disc is now capable of storing large amounts of data which would have required a stack of several discs in the past. Some drive manufacturers have begun to produce disc drives having fewer discs, and even a single disc, as often a single disc may have storage capacity sufficient for a given application. One advantage to providing only one disc is that the actuator must carry only one or at most two heads. Such an actuator may have only one arm and therefore have a rotational inertia much smaller than that of conventional actuators with multiple arms. Moreover, an actuator with only one arm may be produced from a single planar sheet of material, supporting a coil at one end and a head suspension at another. This type of actuator may be more easily manufactured than conventional actuators, and is further advantageous in that it has relatively low inertia, allowing faster seek acceleration/deceleration and having a relatively high natural resonant frequency.

However, a planar actuator does not have the elongate bore a conventional actuator uses to mount a conventional bearing cartridge. While the conventional actuator bearing cartridge has been found to be generally satisfactory when combined with an actuator used to access a large number of discs, this pivot structure also has several disadvantages. For example, the actuator bore wall must be of sufficient height and thickness to securely mount to the cartridge, increasing the rotational inertia of the actuator assembly. Installation of the cartridge into the bore is complicated, generally requiring additional fasteners and/or precision press-fitting operations. Moreover, the conventional actuator/bearing cartridge assembly uses the bearing shaft as the stationary component, while the outer portions of the bearings and the cartridge sleeve rotate around the shaft, adding to the rotational inertia of the assembly.

What the prior art has been lacking is an actuator and pivot assembly which is particularly suited for use with disc drives having two or fewer discs and a planar actuator, which is easily assembled and which has decreased rotational inertia so as to increase responsiveness and raise the resonance frequency of the assembly.

SUMMARY OF THE INVENTION

The present invention is directed to an easily assembled bearing cartridge mounting arrangement. In a preferred embodiment, a pivot assembly includes a bearing and a shaft. The bearing is mounted to a disc drive base, and the shaft pivots within the bearing. An actuator is mounted to an upper end of the shaft. Additional features and benefits will become apparent upon a review of the attached figures and the accompanying description.

DETAILED DESCRIPTION OF THE INVENTION

Figure 1:
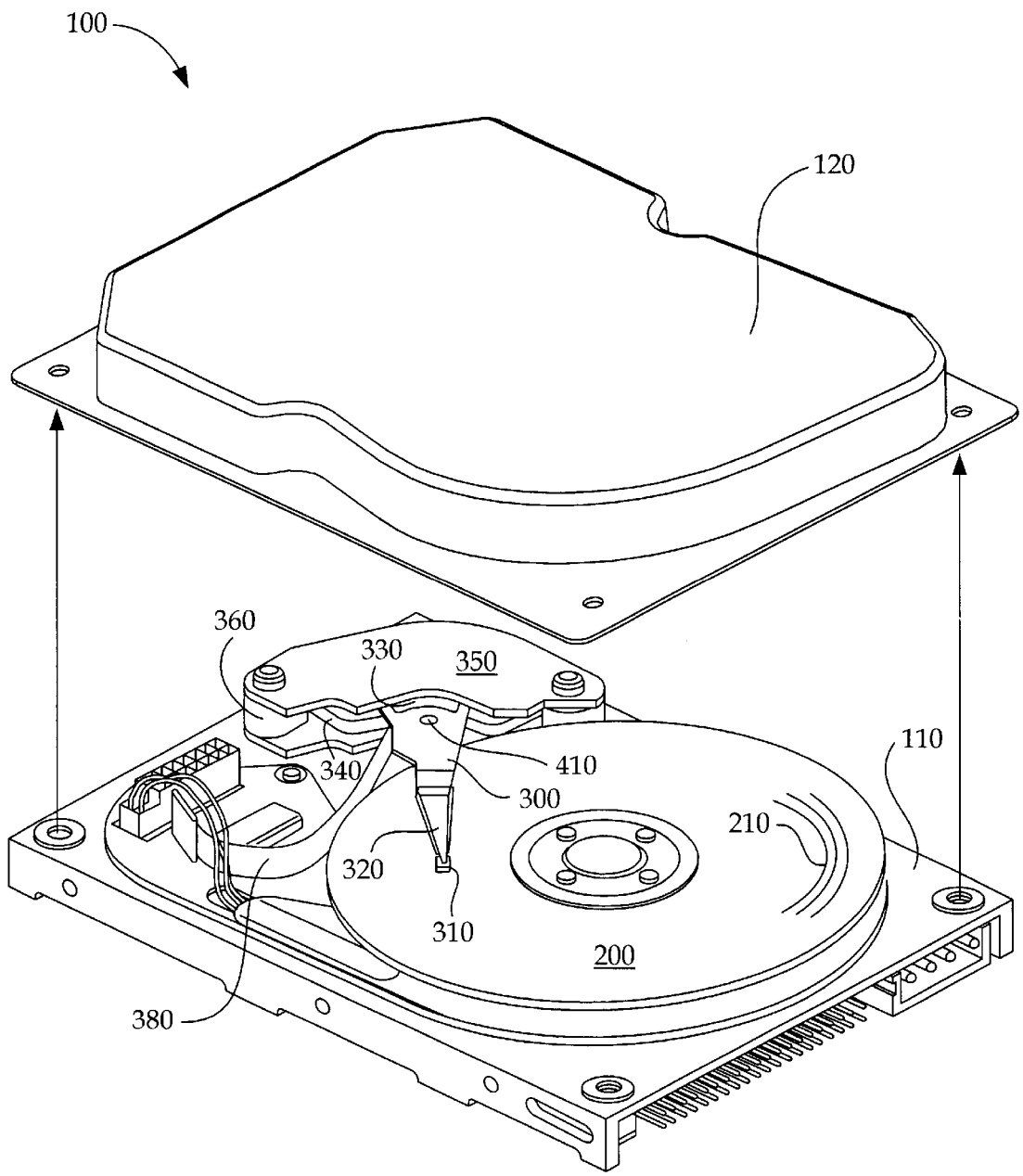
FIG. 1 shows an exploded view of a disc drive incorporating the bearing mounting assembly of the present invention.

Turning now to the drawings and specifically to FIG. 1, shown is an exploded view of an example of a disc drive 100 in which the present invention is particularly useful. The disc drive 100 includes a deck 110 to which all other components are directly or indirectly mounted and a top cover 120 which, together with the deck 110, forms a disc drive housing which encloses delicate internal components and isolates these components from external contaminants.

In a preferred embodiment of the invention, the disc drive 100 includes a single disc 200 which is mounted for rotation on a spindle motor (not shown). The disc 200 includes on its surface a plurality of circular, concentric data tracks 210 on which data are recorded via a head assembly 310. The head assembly 310 is supported by flexure 320, which is attached to an arm portion of actuator 300.

Power to drive the actuator 300 about the pivot shaft 410 is preferably provided by a voice coil motor (VCM). The VCM consists of a coil 330 which is supported by the actuator 300 within the magnetic field of a permanent magnet assembly having spaced upper and lower magnets 340. The magnets 340 are mounted to spaced pole pieces 350 which are fixed to the deck 110 and are further spaced from one another by spacers 360. Electronic circuitry is provided on a printed circuit board (PCB, not shown) mounted to the underside of the deck 110. Control signals to drive the VCM are carried between the PCB and the moving actuator 300 via a flexible printed circuit cable (PCC) 380, which also transmits data signals to and from the head 310.

Figure 2:
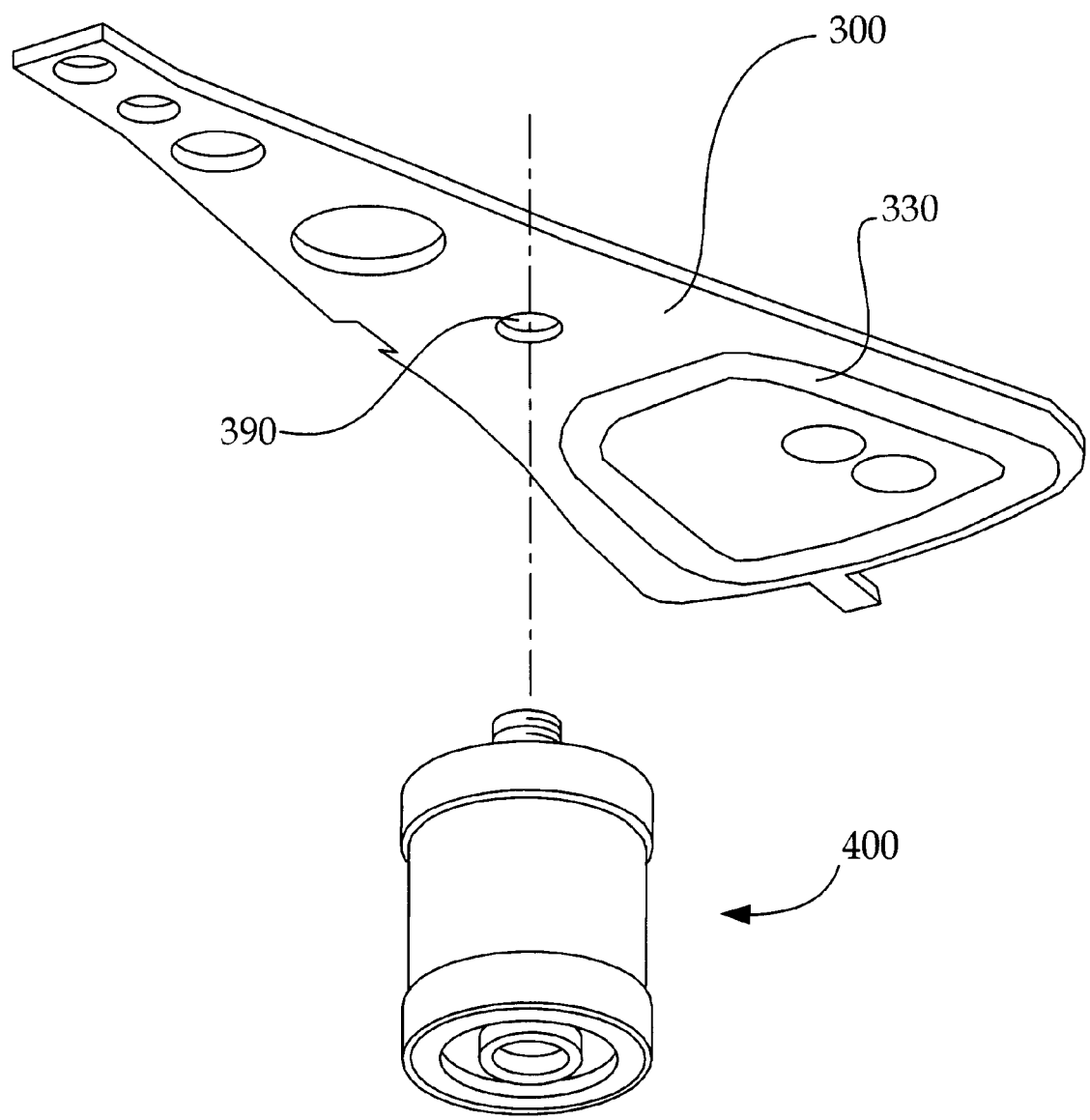
FIG. 2 shows an exploded view of an actuator and pivot assembly of the present invention.

FIG. 2 shows an exploded view of a pivot assembly 400 and an actuator 300. Actuator 300 is a planar member, and may be manufactured by any of a variety of methods. For example, the actuator 300 may be stamped from sheet material, or may be formed by extrusion. The actuator 300 may be formed of any of a number of materials, including metals such as aluminum, plastics or laminates. The actuator 300 also includes an aperture 390 therethrough for mounting to the pivot assembly 400, the functioning of which will be described below.

Figure 3:
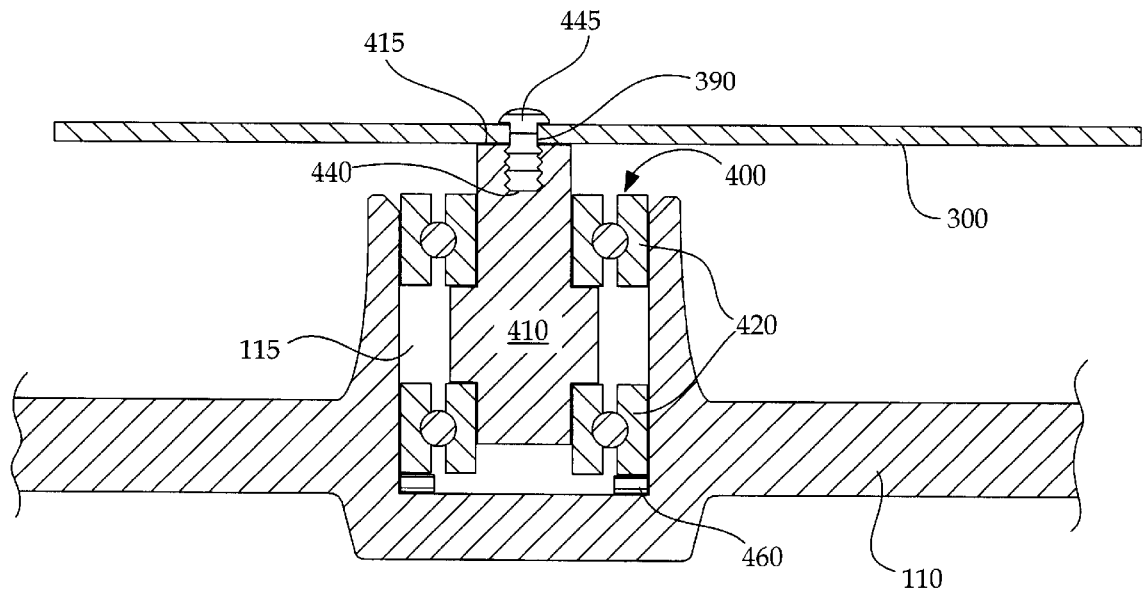
FIG. 3 depicts a cross-sectional view of one embodiment of a pivot assembly and actuator mounted in a drive deck.

FIG. 3 shows a cross-sectional view of the actuator 300 mounted to a pivot assembly 400 which is in turn fixed to drive base 110, allowing the actuator 300 to rotate with respect to base 110. The pivot assembly is shown in FIG. 3 to include a rotating pivot shaft 410 which has an upper end 415 which serves as a support surface for the actuator 300. The pivot shaft 410 is held in position by a pair of ball bearings 43. The shaft 410 is fixed to the inner races of bearings 420 while the outer races of the bearings 420 are fixed to the disc drive base 110. In one embodiment, illustrated in FIG. 3, the base 110 includes a downwardly extending bore 115. The bearings 420 are fixed within the bore 115 such that the shaft 410 extends above the upper end of the bore 115, thereby permitting the actuator 300 to rest upon the upper surface 415 of the shaft 410. It can also be seen in FIG. 3 that the inner race of lower bearing 420 is spaced from the bottom of the bore 115 so it may rotate relative to the outer race. FIG. 3 shows one method in which spacers 460 are provided below the outer race of lower bearing 420, although this spacing may of course be accomplished by any suitable method. In this embodiment, the individual components of the pivot assembly 400 are easily installed within the bore 115 by press-fitting, adhesive or similar means prior to installing the actuator, and need not necessarily be assembled in cartridge form as is typically required when used with conventional actuators.

Figure 4:
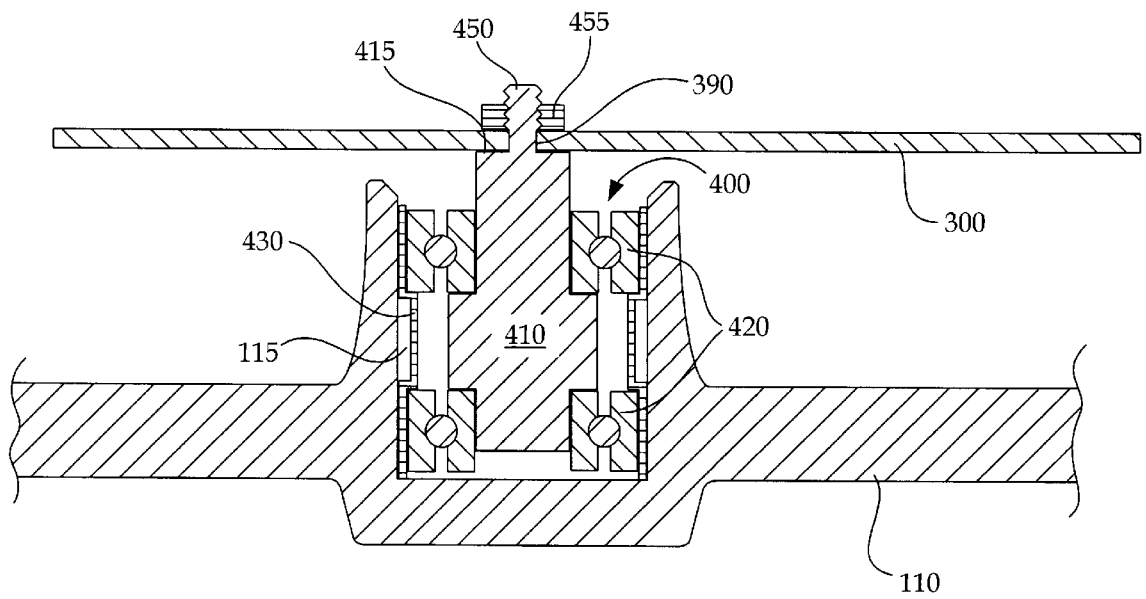
FIG. 4 depicts a cross-sectional view of another embodiment of a pivot assembly and actuator mounted in a drive deck.

In another contemplated embodiment, however, the pivot assembly 400 may take the form of a preassembled cartridge bearing similar to those which are inserted into conventional actuator bores. Such an arrangement is shown in FIG. 4. This figure shows a cartridge bearing 400 with a rotatable pivot shaft 410 and an outer sleeve 420 separated at upper and lower ends thereof by upper and lower ball bearings 420. In this manner it will be understood that the sleeve 430 is rigidly supported within the bore 115 and the shaft 410 is free to rotate within the sleeve 430. The sleeve 430 of the bearing cartridge 400 shown here forms an upper shoulder, a lower shoulder, and a groove of a reduced diameter between the shoulders. This preassembled arrangement is advantageous in that cartridge manufacture may be easily outsourced and, once assembled, is easily installed in the drive 100. Like the embodiment shown in FIG. 3, the preassembled cartridge assembly 400 may be mounted to the base 110 in any number of ways. FIG. 4 show it to be mounted within the bore 115 and may be press-fit therein or secured using an adhesive. One advantage gained by use of the bore 115 is that the base 110 is sealed so as to prevent contaminants from entering the drive 100. Of course, threaded fasteners or other such conventional methods may also be used, provided that some form of sealing is provided so as to prevent contaminants from entering the drive 100.

Turning again to FIG. 3, shown is one arrangement for mounting the actuator 300 to the pivot assembly 400. In the illustrated embodiment, the shaft 410 includes a threaded bore 440 extending downwardly from the upper surface 415. The actuator 300 is positioned on the upper surface 415, and a screw 445 extends through aperture 390 in the actuator 300 and is threaded into bore 440 in order to secure the actuator 300 to shaft 410.

Another arrangement for securing the actuator 300 to shaft 410 is shown in FIG. 4. Here, shaft 410 includes a threaded member 450 extending upwardly from the upper surface 415 of the shaft 410. The threaded member 415 extends through the hole 390 in the actuator 300 and a nut 455 is then fastened to the threaded projection 415 to secure the actuator 300 to the shaft 410.

One advantage provided by the pivot assembly 400 described herein is ease of assembly. Typically, a bearing cartridge must be mounted within a bore in the actuator prior to installing the actuator into the drive deck 110. However, the pivot assembly described here facilitates what is known as "top-down" assembly. The pivot assembly is easily installed in the deck 110 prior to placing the actuator 300 on top of the pivot shaft 410, and a fastener is then easily placed atop the actuator 300 to secure it to the shaft.

Another advantage of the pivot assembly described herein is that it has a rotational inertia which is significantly reduced relative to that of conventional pivot assemblies.

This is because the pivot shaft and the inner bearing races are stationary in the conventional pivot assembly while the outer races and cartridge sleeve rotate about them. In the presently disclosed assembly, on the other hand, the outer races are stationary while the inner races and shaft rotate. It will be understood that the outer races and sleeve are positioned a greater distance from the pivot axis than are the inner races and pivot shaft, thereby providing such an assembly with a greater moment of inertia relative to that of the assembly 400 described here. The lower rotational inertia of the presently disclosed pivot assembly results in a higher resonant frequency of the pivot-actuator assembly, something which is generally desirable in order to prevent read/write errors caused by a resonating actuator assembly. It should be noted that this effect is even more pronounced when used with an actuator formed from a single blank such as that shown in FIG. 2, since this type of actuator also has a relatively low rotational inertia.

A related advantage of the present disclosed assembly 400 is that stiffness is much improved over conventional pivots, in which a small, stationary shaft was mounted at a lower end to the drive deck, and was required to support the entire the actuator as well as the bearings and sleeve of the pivot assembly. In the present disclosed assembly 400, on the other hand, bearings 420 are securely fixed within bore 115 and support only the shaft 410 in addition to the actuator 300.

Figure 5:
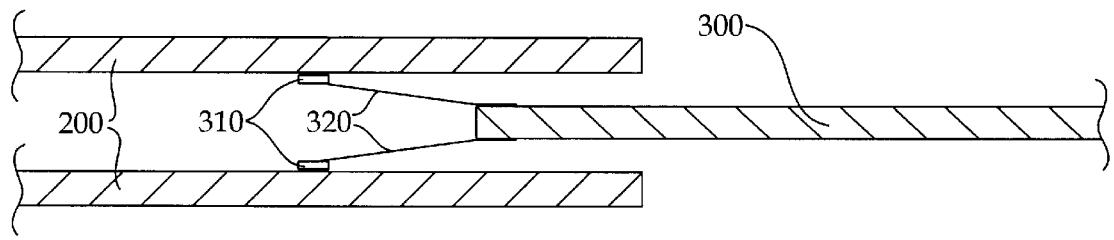
FIG. 5 depicts a cross-sectional view of an embodiment in which two discs may be accessed by head assemblies.
Figure 6:
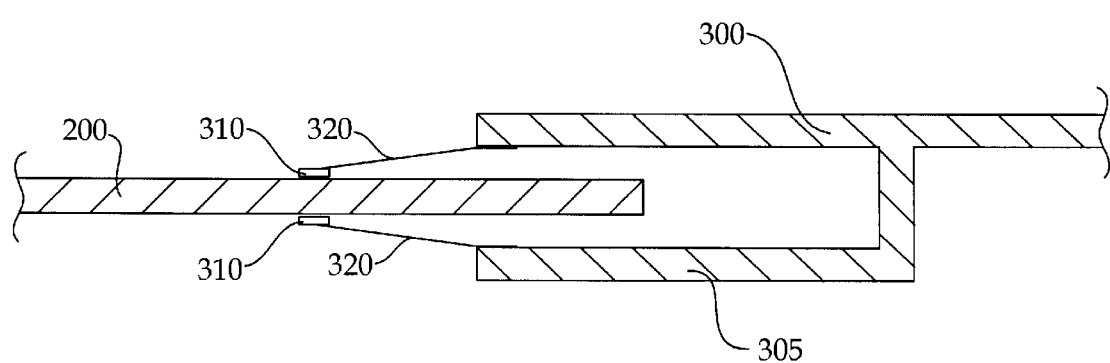
FIG. 6 depicts a cross-sectional view of another embodiment in which two surfaces of the same disc may be accessed by head assemblies.

Of course, it should be understood that the device described herein may be modified without departing from the spirit of the invention. For example, while a single actuator arm is advantageous for its ease of manufacture and low inertia, it is contemplated that additional arms 305 could be added for the purpose of accessing additional disc surfaces as shown in FIG. 6. It is also contemplated that actuator 300 could be provided with two heads 310 and support assemblies 320 and installed between two discs 200 as in FIG. 5, so as to allow access to two disc surfaces while maintaining the advantages described above with respect to a single, planar actuator.

Alternately characterized, one contemplated embodiment of the invention takes the form of a disc drive 100 having a base 110, and actuator 300 and a pivot assembly 400 for rotatably mounting the actuator 300 to the base 110. The pivot assembly 400 includes a rotatable, vertically oriented elongate shaft (such as 410) which has an upper horizontal surface (such as 415) to which the actuator (such as 300) is secured. A fastening element 445 may be provided for securing the actuator 300 to the shaft 410 and may optionally take the form of a threaded element (such as 450) protruding from the upper surface 415 of the shaft 410 or a threaded bore (such as 440) extending downwardly from the upper surface 415 of the shaft 410. The pivot assembly 400 may optionally include a bearing (such as 420) fixedly mounted to the base 110, and may include as a further option a sleeve (such as 430) positioned between the bearing 240 and the base 110. The base 110 may optionally include a bore (such as 115) in which the pivot assembly 400 may be securely mounted. The actuator 300 may optionally consist of a planar member (such as 300) having a first end configured to support a portion of a voice coil motor (such as 330) and a second end configured to support a flexible head suspension assembly (such as 320). The pivot assembly may further include a removable fastener (such as 445 or 455) for securing the actuator 300 to the upper surface 415 of the shaft 410. Optionally the actuator 300 may include first and second coplanar ends for supporting a portion of a voice coil motor (such as 330) and a first flexible head support assembly (such as 320). The second end of the actuator 300 may further be configured to support a second flexible head suspension assembly (such as 320). As yet a further option, the actuator 300 may include an arm (such as 305) in a plane parallel to the main actuator plane, configured to support a second flexible head suspension assembly (such as 320).

Alternately characterized, another contemplated embodiment of the invention takes the form of a disc drive 100 comprising a base 110, a pivot assembly 400 mounted to the base 110 and including a rotatable shaft (such as 410) mounted to the base, and an actuator (such as 300) mounted to the shaft 410, the actuator 300 consisting of a planar member (such as 300) having first and second ends, as well as a flexible head suspension member (such as 320) mounted to and overlying the second end of the actuator 300. Optionally, a portion of a voice coil motor (such as 330) may be mounted to the first end of the actuator 300. As a further option, the shaft 410 may be vertically oriented and have an upper horizontal surface 415 to which the actuator 300 is secured. Optionally, the actuator may be formed by extrusion or stamping.

From the foregoing, it is apparent that the present invention is particularly suited to provide the benefits described above. While particular embodiments of the invention have been described herein, modifications to the embodiments which fall within the envisioned scope of the invention may suggest themselves to one of skill in the art who reads this disclosure and are limited only by the following claims.

What is claimed is:

1. A disc drive comprising:
   a base;
   a pivot assembly for rotatably mounting an actuator to the base, the pivot assembly comprising:
      a vertically oriented elongate shaft of one-piece construction mounted for rotation with respect to the base, the shaft including an upper horizontal surface; and
   an actuator secured to and in contact with the upper surface of the shaft.

2. The disc drive of claim 1, further comprising:
   a fastening element at an upper end of the shaft for securing the actuator to the shaft.

3. The disc drive of claim 2, the fastening element further comprising:
   a threaded element protruding from the upper surface of the shaft.

4. The disc drive of claim 2, the fastening element further comprising:
   a threaded bore extending downwardly from the upper surface of the shaft.

5. The disc drive of claim 1, the pivot assembly further comprising:
   a bearing fixedly mounted to the base.

6. The disc drive of claim 5, the pivot assembly further comprising:
   a sleeve positioned between the bearing and base.

7. The disc drive of claim 6, the base further comprising:
   a bore, the pivot assembly being securely mounted within the bore.

8. The disc drive of claim 1, the actuator consisting of:
   a planar member comprising:
      a first end configured to support a portion of a voice coil motor; and
      a second end configured to support a flexible head suspension assembly.

9. The disc drive of claim 8, further comprising:
a coil connected to the first end of the actuator.

10. The disc drive of claim 8, further comprising:
a flexible head suspension assembly connected to the second end of the actuator.

11. The disc drive of claim 1, the pivot assembly further comprising:
a removable fastener for securing the actuator to the upper surface of the shaft.

12. The disc drive of claim 1, the actuator further comprising:
a first end for supporting a portion of a voice coil motor; and
a second end configured to support a first flexible head suspension assembly, the first end and second end both lying in a first plane.

13. The disc drive of claim 12, in which the second end of the actuator is configured to support a second flexible head suspension assembly.

14. The disc drive of claim 12, the actuator further comprising:
an arm configured to support a second flexible head suspension assembly, the arm lying in a second plane parallel to the first plane.

15. A disc drive comprising:
a base;
an actuator; and
means for pivotably mounting the actuator to the base.

16. The disc drive of claim 15, the mounting means further comprising:
a horizontal surface rotatable about a vertical axis, the actuator being secured to the horizontal surface.

17. The disc drive of claim 15, the mounting means further comprising:
a bearing fixedly mounted to the base.

18. The disc drive of claim 15, the actuator consisting of:
a planar member.

19. The disc drive of claim 15, the mounting means further comprising:
a fastener for securing the actuator to the mounting means.

* * * * *